US008132116B1

(12) United States Patent
Schendel

(10) Patent No.: US 8,132,116 B1
(45) Date of Patent: Mar. 6, 2012

(54) CONFIGURABLE ICONIC IMAGE REPRESENTATION

(75) Inventor: Claire Schendel, Petaluma, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1016 days.

(21) Appl. No.: 12/074,111

(22) Filed: Feb. 28, 2008

(51) Int. Cl.
*G06F 13/00* (2006.01)
*G06F 15/00* (2006.01)

(52) U.S. Cl. ........................................ 715/764; 715/801

(58) Field of Classification Search .................. 345/521; 715/781, 788, 800, 763–765, 727, 738
See application file for complete search history.

(56) References Cited

U.S. PATENT DOCUMENTS 6,868,192 B2 3/2005 Takiguchi
6,964,025 B2 11/2005 Angiulo et al.
7,069,506 B2 6/2006 Rosenyholtz et al.
7,159,193 B2 1/2007 Wada
2002/0135621 A1* 9/2002 Angiulo et al. ............... 345/838
2004/0205627 A1* 10/2004 Rosenholtz et al. .......... 715/526
2006/0164441 A1 7/2006 Wada et al.
2006/0177152 A1 8/2006 Lin et al.
2006/0215915 A1 9/2006 Kim
2006/0224993 A1* 10/2006 Wong et al. .................. 715/800
2007/0058872 A1 3/2007 Jang et al.
2007/0188774 A1 8/2007 Yudasaka et al.

* cited by examiner

*Primary Examiner* — Cao "Kevin" Nguyen
(74) *Attorney, Agent, or Firm* — Robert C. Kowert; Meyertons, Hood, Kivlin, Kowert & Goetzel, P.C.

(57) ABSTRACT

Techniques for configurable iconic image representation are described, including receiving an input, the input indicating selection of a graphical element associated with one or more columns, performing a determination using the input, and formatting a layout based on the determination and in response to the selection of the graphical element, a size of the graphical element representing a parameter associated with the one or more columns.

22 Claims, 11 Drawing Sheets

CONFIGURABLE ICONIC IMAGE REPRESENTATION

FIELD OF THE INVENTION

The present invention relates generally to software. More specifically, techniques for configurable iconic image representation are described.

BACKGROUND

Selection of image thumbnail sizes in a display is problematic using conventional sizing techniques. In order to preview multiple images, photos, graphics, or other visual content, image thumbnails are typically displayed in regularly formatted columns and rows. Traditionally, the maximum number of columns is determined using the grid width and the minimum pixel size of an image file. The number of columns displayed and size of the image thumbnail are often variable and controlled by a user. However, conventional techniques for manipulating the size of image thumbnails are limited in functionality and performance.

Some conventional techniques for sizing image thumbnails and selecting the number of columns to be displayed are controlled by manipulating an onscreen element such as a slider widget. As a slider widget is manipulated from left to right, the size of image thumbnails is altered (e.g., increases or decreases in size incrementally). When the size of an image thumbnail becomes too large for the number of columns presently displayed, the number of columns decreases and the image thumbnails are re-configured in size accordingly. However, conventional solutions are inefficient or difficult to use. Using conventional solutions, a user must incrementally increase the size of an image thumbnail to maximize the image thumbnail size for the number of columns desired. Many conventional solutions subject the user to unnecessary and undesirable intermediate sizing of image thumbnails, often requiring time and labor-intensive "trial-and-error" efforts. Conventional solutions are labor-intensive and require multiple attempts to re-size image thumbnails, which disrupts workflow efficiency. Further, the selection of image thumbnail sizes is not available in many, conventional, web-based applications because of performance inefficiency related to the numerous incremental resizing requests associated with on-screen elements (e.g., a slider "widget").

Thus, what is needed is a solution for configuring and presenting thumbnails without the limitations of conventional techniques.

BRIEF DESCRIPTION OF THE DRAWINGS

Various examples of the invention are disclosed in the following detailed description and the accompanying drawings.

DETAILED DESCRIPTION

Figure 1:
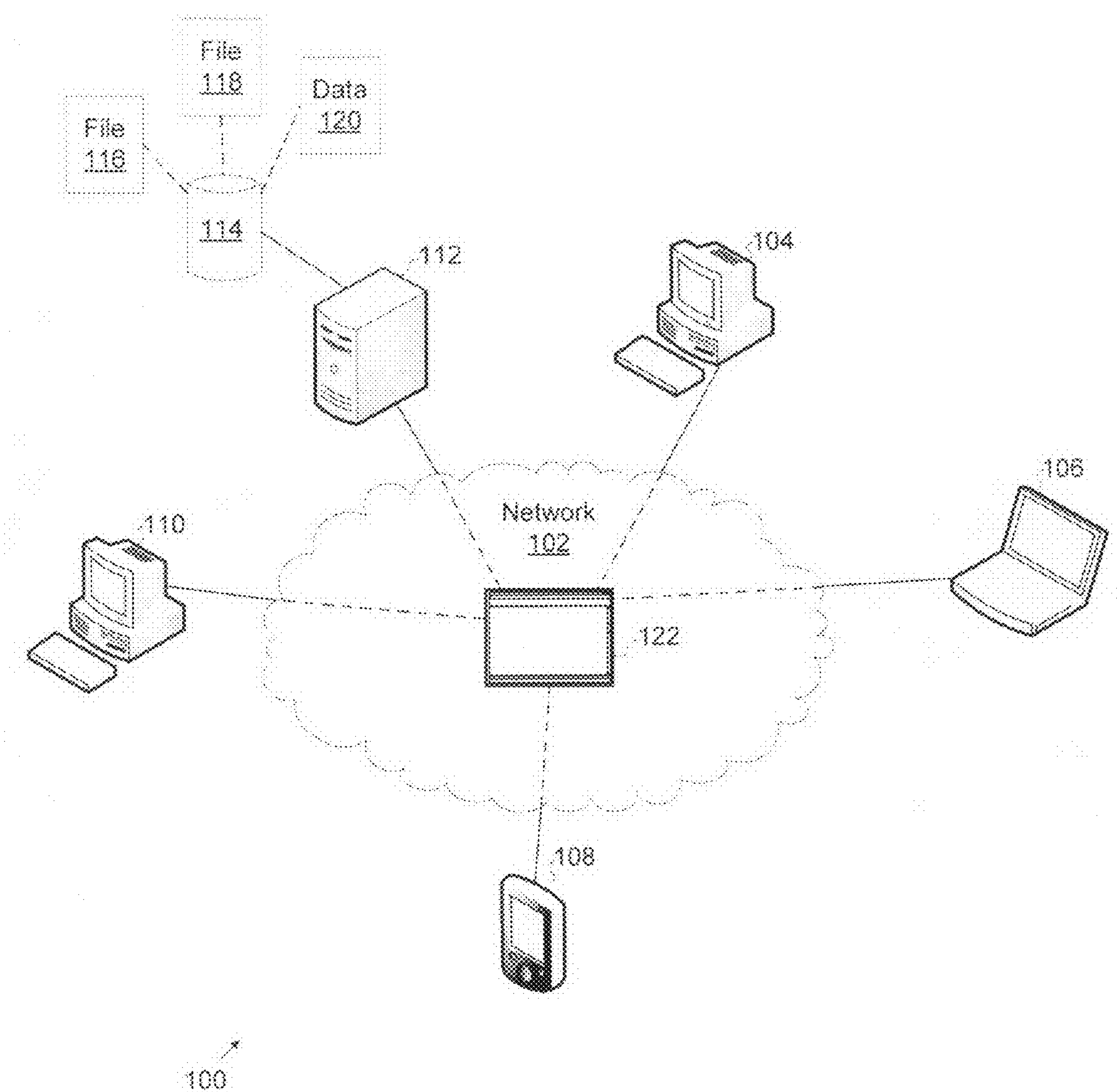
FIG. 1 illustrates an exemplary system configured to implement configurable iconic image representation.

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

In some examples, the described techniques may be implemented as a computer program or application ("application") or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, ActionScript™, Ajax, COBOL, Fortran, ADA, XML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Configurable iconic image representation is described. Various techniques are described, including presenting a graphical element (i.e., a visual icon, widget, or other graphically presented item that is associated with a layout of image thumbnails) that, when selected, adjusts presentation (i.e., display) of image, photo, graphical, or other types of thumbnails (hereafter "image thumbnails") in size and layout. In some examples, a size associated with a graphical element is configured to represent a layout of image thumbnails in one or more columns. For example, a series of graphical elements may be presented in different sizes. The size of each graphical element may be an abstract representation of the number (i.e., quantity) and layout of image thumbnails that may be presented, where the size of an image thumbnail is determined using the width of a grid and the width of a column associated with the grid. When a graphical element is selected, image thumbnails are resized and presented in one or more columns on a grid, where the size of the graphical element is determined by dividing the grid width by the number of columns. As used herein, "grid" may refer to an area or region where image thumbnails are presented (e.g., a display or screen), which may be measured using a pixel count or other technique. As an example, one or more graphical elements may be presented adjacent to each other in a panel or palette (hereafter "panel"). The number of graphical elements displayed may correspond to the number of columns that are available for display. In some examples, the grid width may be divided by the number of columns represented by a graphical element to determine, a width for each image thumbnail to be presented in a grid, which may or may not include additional space or a border surrounding each image thumbnail, when presented. When a graphical element is selected, a width of one or more image thumbnails to be presented may be modified based on the number of columns to be presented. Invocation of a graphical element may be performed, in some examples, using various techniques, including providing a slider that is configured to manipulate presentation of graphical elements (e.g., scrolling horizontally or vertically through a set of different-sized graphical elements, each of which represent a given number of columns and image thumbnail size determined accordingly). Further, when the grid width of a display is modified, the width of an image thumbnail is adjusted in order to maintain the corresponding number of columns.

In other words, image thumbnails may be manually, semi-automatically, or automatically resized when a grid, application window, display or panel, browser is modified in size. In other examples, the described techniques may be implemented differently in design, function, layout, order, or configuration and are not limited to the examples provided.

FIG. 1 illustrates an exemplary system configured to implement configurable iconic image representation. Here, system 100 includes network 102, clients 104-110, server 112, repository 114 (i.e., storing files 116-118 and data 120; data may be stored using various types of data structures other than files or documents), and graphical user interface ("interface") 122. In some examples, interface 122 may be accessed from any type of endpoint, device, client, peer, or the like, including clients 104-110. Clients 104-110 may be wired, wireless, mobile, and in data communication with server 112 using any type of public or private data network or topology (e.g., the Internet, a local area network (LAN), wide area network (WAN), municipal area network (MAN), and others). In other examples, the number, type, configuration, and topology of system 100, network 102, clients 104-110, and server 112 may be varied and are not limited to the descriptions provided.

Here, any of clients 104-110 and server 112 may access files 116-118 and data 120 using interface 122. In some examples, interface 122 may be associated with a common, shared, or otherwise connected ("connected") application that allows users to view, read, and access other users' input (i.e., edits, additions, deletions, or other modifications). For example, a user on client 104 may be working with an application rendering interface 122 to access file 118 from server 112 and repository 114. While working with interface 122, accesses to file 118 from, for example, clients 106-110 may be viewed using the techniques described herein. Further, accesses may be viewed as a history or list of accesses to a given file and, when an individual access is selected, the individual access may be presented and viewed. Still further, a visual element disposed over a visual indicator may be manipulated to navigate through a history of accesses to, for example, files 116-120. In other examples, system 100 and the above-described elements may be implemented differently and are not limited to the descriptions provided.

Figure 2:
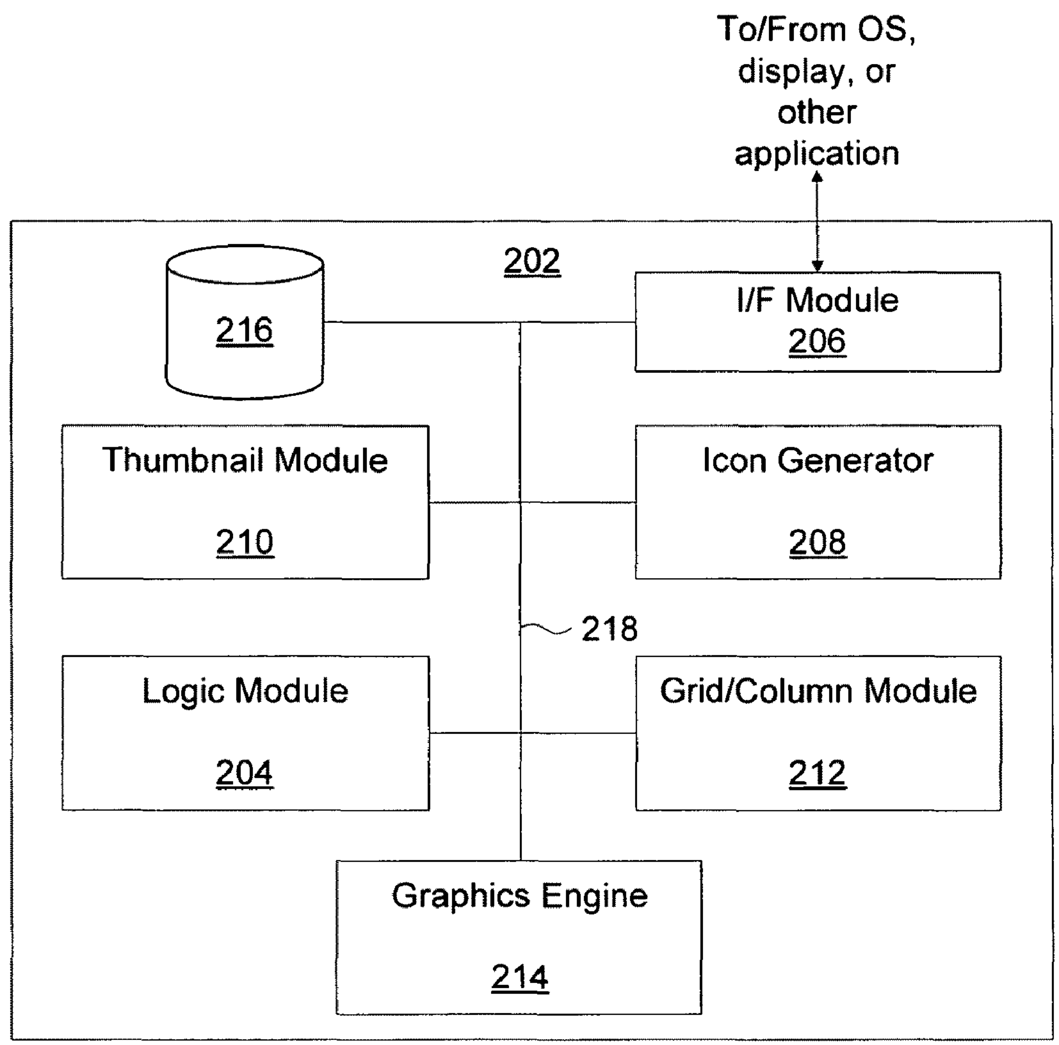
FIG. 2 illustrates an exemplary application architecture configured to implement configurable iconic image representation.

FIG. 2 illustrates an exemplary application architecture configured to implement configurable iconic image representation. Here, application 202 includes logic module 204, interface (I/F) module 206, icon generator 208, thumbnail module 210, grid/column module 212, graphics engine 214, repository 216, and bus 218. In some examples, repository 216 may be implemented similarly or substantially similarly to repository 114 (FIG. 1) as a database, data mart, data warehouse, storage area network (SAN), redundant array of independent disks (RAID), or other storage facility. In other examples, repository 216 may be implemented differently than as described above.

Here, logic module 204 is configured to manage interface (I/F) module 206, icon generator 208, thumbnail module 210, grid/column module 212, graphics engine 214, repository 216 by generating and transmitting control signals and data over bus 218. As described below, logic module 204, in association with some, none, or all of interface (I/F) module 206, icon generator 208, thumbnail module 210, grid/column module 212, graphics engine 214, and repository 216, may be used to implement the described techniques.

In some examples, I/F module 206 provides data input from and output to an operating system, display, or other application configured to implement application 202. In some examples, data input to I/F module 206 may be a parameter associated with a display. In other examples, data input to or information output from I/F module 206, thumbnail module 210, icon generator 208 and grid column module 212 may be received or sent using graphics engine 214.

In some examples, a graphical element may be generated by icon generator 208 and rendered and presented (i.e., displayed) by graphics engine 214 and I/F module 206. Configuring the size of a graphical element may be performed by logic module 204 and icon generator 208. Further, I/F module 206 may be configured to receive, interpret, handle, or otherwise manage input received from an interface (e.g., interface 122 (FIG. 1)) when a graphical element is selected. In other examples, application 202 and the above-described elements may be implemented differently and are not limited to the descriptions provided.

Figure 3A:
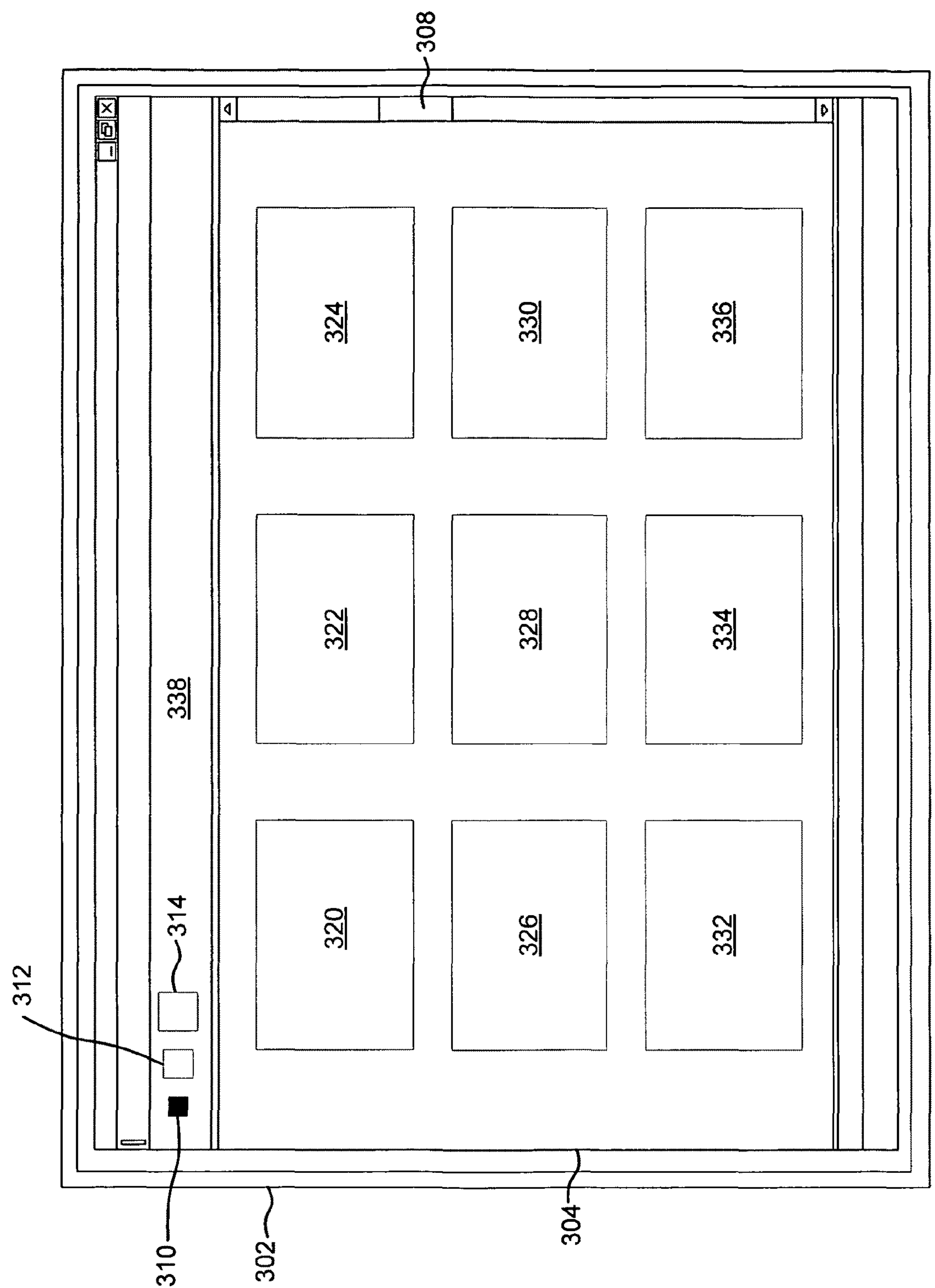
FIG. 3A illustrates an exemplary interface for configurable iconic image representation.

FIG. 3A illustrates an exemplary interface for configurable iconic image representation. Here, interface 302 includes grid or display 304 (hereafter "display 304"), scroll bar 308, graphical elements 310-314, image thumbnails 320-336, and panel 338. Here, image thumbnails 320-336 may be presented in display 304 and graphical elements 310-314 may be presented on panel 338. In other examples, graphical elements 310-314 may be presented elsewhere in interface 302 and are not limited to the examples provided.

In some examples, graphical elements 310-314 may be implemented using any type of element configured to receive an input (e.g. geometric shape, icon, number, or others) that indicates how image thumbnails 320-336 are to be presented on a grid (i.e., display 304). The number, shape, size, position, layout, or other attributes of graphical elements 310-314 may be implemented differently and are not limited to the examples shown. For example, more or fewer graphical elements may be implemented and, in some examples, if multiple graphical elements are presented a slide bar that is similar or substantially similar in function to scroll bar 308 may be presented also (e.g., horizontally, vertically, and others). In some examples, the size of graphical elements 310-314 may be a parameter (e.g., column width) associated with the presentation of image thumbnails 320-336 in one or more columns presented on display 304. As shown here, the size of graphical elements 310-314 is configured to indicate generally the column width of image thumbnails 320-336 as configured in one or more columns. Further, the size of graphical elements 310-314 is associated with the quantity of one or more columns. Still further, the size of graphical elements 310-314 may be inversely proportional to the quantity of columns shown in display 304 and directly proportional to the size of image thumbnails 320-336. In other words, graphical elements 310-314 may be configured to indicate the size of image thumbnails and the quantity of columns that, after selecting one of graphical elements 310-314, are presented on display 304. Alternatively, the size of graphical elements 310-314 may be configured to be directly proportional to the quantity of one or more columns and inversely related to the size of image thumbnails 320-336. In other examples, the configuration of the appearance, features, function, or attributes of graphical elements 310-314 may be implemented differently and is not limited to the descriptions provided.

Here, graphical element 310 is shown selected (i.e., darkened or shaded, although different visual indications of selection may be used and are not limited to the examples provided). In some examples, when graphical element 310 is selected, the number of columns determined is three and the width of image thumbnails 320-336 is modified to implement a layout with three columns. For example, if the grid width of display 304 is 150 pixels (or other units of measurement), and graphical element 310 is selected to indicate three columns, each column width would be 50, which may or may not also include borders and spacing between each column. Still further, the height of image thumbnails 320-336 may be determined by using the width of image thumbnails 320-336 to determine the number of columns that may fit onto display 304. Once determined, parameters such as grid width, the number of columns, the column width, and the number of image thumbnails 320-336 (e.g., nine (9)) may be used to determine a height for each of image thumbnails 320-336. In other examples, different parameters associated to graphical elements 310-314 may be varied and are not limited to the descriptions provided.

In some examples, when the grid width of display 304 is modified, the total number of columns presented in display 304 may be determined based on a minimum image thumbnail size specified, for example, by a user, and the grid width. In other examples, when the grid width of the display is modified, the available number of columns presented in display 304 may be determined based on the grid width and the previous image thumbnail width. For example, if the original grid width is 150 (e.g., pixels) and the width of the column is 50, when the grid width is modified to 100, the column width remains 50 and the available number of columns decreases from three to two. Conversely, if grid width is modified to 200 (e.g., pixels) and the width of each column is 50, the available number of columns increases from three to four. In other examples, the available number of columns in display 304 may be restricted to a given quantity, as set by a user, system, application 200 (FIG. 2), or others. In other examples, interface 302 and the above-described techniques may be varied and are not limited to the descriptions provided.

Figure 3B:
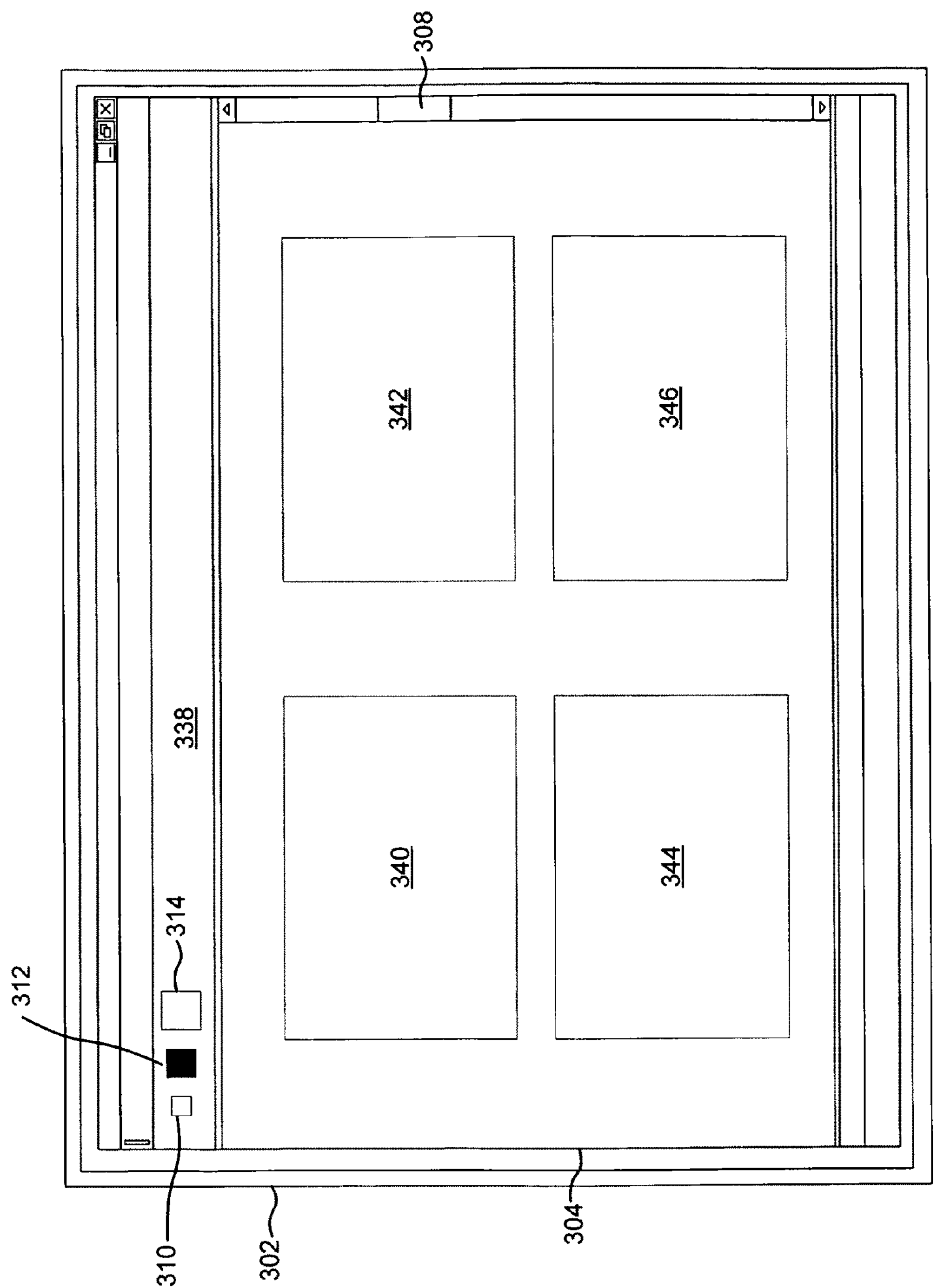
FIG. 3B illustrates a further exemplary interface for configurable iconic image representation.

FIG. 3B illustrates a further exemplary interface for configurable iconic image representation. Here, interface 302 includes display 304, scroll bar 308, graphical elements 310-314, panel 338, and image thumbnails 340-346. In some examples, image thumbnails 340-346 are presented in display 304 and graphical elements 310-314 are presented in panel 338. As shown, graphical element 312 has been selected (e.g., by a user, by application 200 (FIG. 2), by a system, or others). As an example, graphical element 312 is intermediate in size, relative to graphical elements 310 and 314. When selected, graphical element 312 provides a parameter as an input to application 200 (FIG. 2) that is used to configure the presentation of image thumbnails 340-346 on display 304. In other examples, the quantity, size, appearance, function, location, or other aspects or attributes of graphical elements 310-314 may be varied and are not limited to the descriptions provided.

Figure 3C:
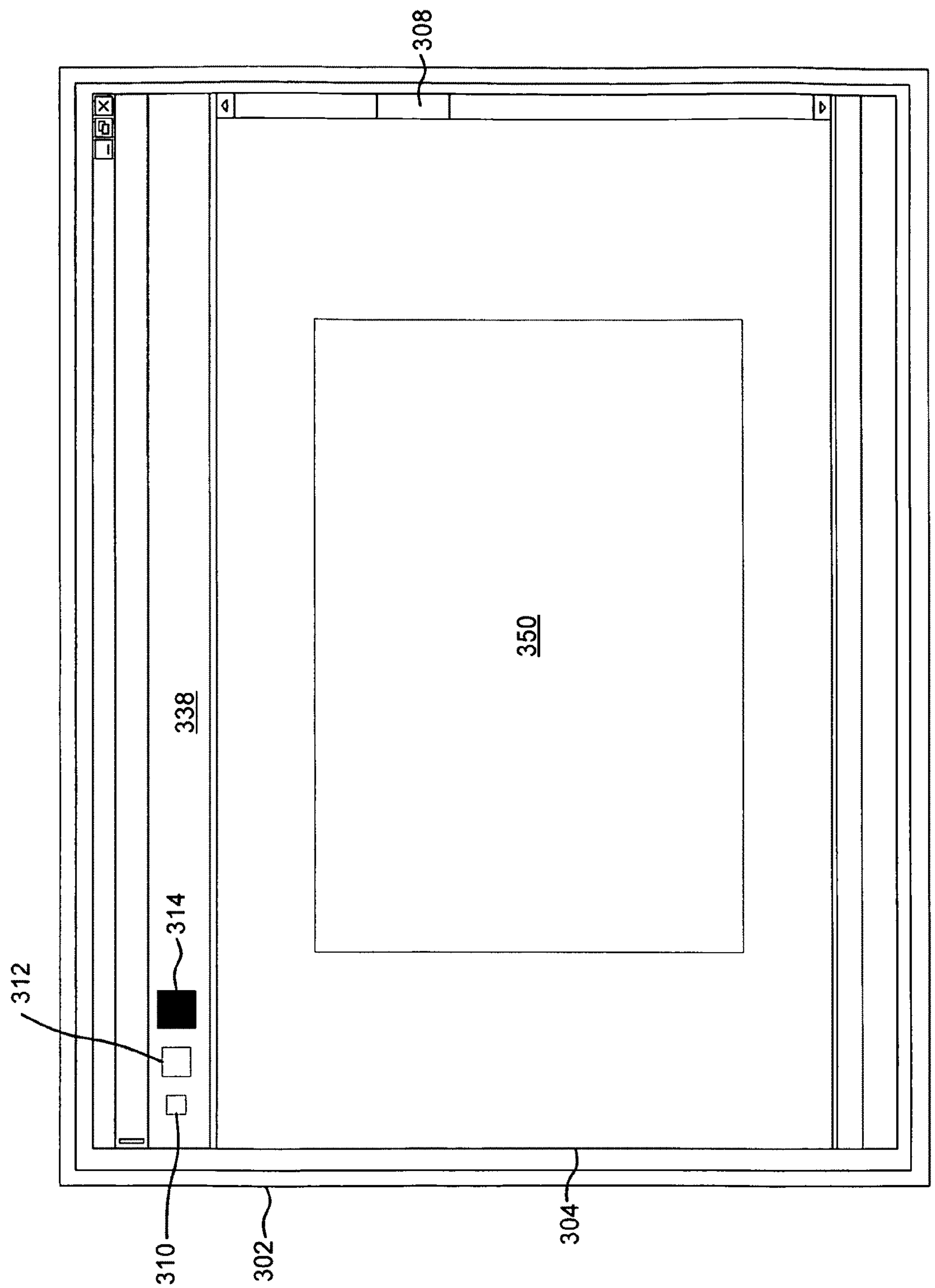
FIG. 3C illustrates another exemplary interface for configurable iconic image representation.

In some examples, graphical elements 310-314 may be implemented using any type of element that is configured to receive an input (e.g. geometric shape, icon, number, or others). Further, the size of graphical elements 310-314 may be associated with a parameter that is used to determine whether one or more columns may fit on display 304. As shown here, the size of graphical elements 310-314 is configured to generally indicate the column width of image thumbnails 340-346 in one or more columns. If graphical element 310 is selected, image thumbnails (e.g., 340-346) may be presented in a larger number of columns, but with smaller image thumbnail sizes. Likewise, graphical element 312 is selected, the size of image thumbnails may be increased (e.g., image thumbnails 340-346) and presented in fewer columns. Further, if graphical element 314 is selected, the size of image thumbnails is increased and the quantity of columns is further reduced, as shown in FIG. 3C. Referring back to FIG. 3B, the size of graphical elements 310-314 may be associated with the number of one or more columns. Still further, the relative sizes of graphical elements 310-314 may be inversely proportional to the number of columns shown in display 304 and directly related to the size of image thumbnails 340-346. In other examples, the size of graphical element 310 to graphical elements 312-314 may be directly proportional to the number of one or more columns and inversely related to the size of image thumbnails 340-346. In other examples, the configuration, function, layout, size, appearance, features, or other attributes of graphical elements 310-314 may be varied and are not limited to the descriptions provided.

Here, graphical element 312 is shown selected. When graphical element 312 is selected, the number of columns determined is two, and the width of image thumbnails 340-346 is modified to present image thumbnails 340-346 in two columns. As an example of a determination that is made to present image thumbnails 340-346 on display 304, if the grid width of display 304 is 150, and graphical element 312 is selected to indicate two columns, each column width may be 75, which may include space between columns, borders, or the like. Still further, the height of image thumbnails 340-346 may be determined by the width of image thumbnails 340-346 by evaluating the height of a grid (i.e., display 304), the number image thumbnails 340-346 (i.e., four), and the grid width. For example, if the height of display 304 is 100 pixels, the number of image thumbnails 340-346 is four (4), and the grid width is 150, then each of image thumbnails 340-346 may be displayed in two columns, with each of image thumbnails having a size of 75 (width) by 50 (height) pixels, which may include intermediate space or borders. In other examples, parameters other than size associated with graphical elements 310-314 may be varied and are not limited to the descriptions provided.

In other examples, when the grid width of display 304 is modified, the total number of columns presented in display 304 may be determined based on a minimum image thumbnail size and the modified grid width. A minimum image thumbnail size, in some examples, may be a size limit that is specified by a user, application (e.g., application 200 (FIG. 2)), system, or the like. Here, when the grid width of the display is modified, the number of columns presented in display 304 may be determined based on the grid width (i.e., after modification) and a previous image thumbnail width. For example, if the grid width is 100 (e.g., pixels) and a column width is 50, when the grid width is modified to 50, the column width remains at 50 and the number of columns decreases from two to one, causing image thumbnails 340-346 to be presented in a single column (not shown). In still other examples, the number of columns presented in display 304 may be limited by a user, application (e.g., application 200 (FIG. 2), system, or the like. Further, interface 302 and the above-described elements may be varied and are not limited to the descriptions provided.

FIG. 3C illustrates a further exemplary interface for configurable iconic image representation. Here, interface 302 includes display 304, scroll bar 308, graphical elements 310-314, and image thumbnail 350. Here, image thumbnail 350 is presented in display 304 and graphical elements 310-314 are presented in panel 338. The location of graphical elements 310-314 may be varied and is not limited to the examples provided.

In some examples, graphical elements 310-314 may include any type of element configured to receive an input (e.g. geometric shape, icon, number, or others). In some examples, the size of graphical elements 310-314 may be associated with a parameter that may be used to determine the column width and number of one or more columns. As shown here, graphical elements 310-314 are configured to visually indicate the size and, by implication, the column width of image thumbnail 350. In other examples, graphical elements 310-314 may be configured differently. Further, the size of graphical elements 310-314 may be inversely proportional to the number of columns shown in display 304 and proportionally indicative (e.g., the smaller the size of graphical elements 310-314, the smaller the size of image thumbnail 350, when presented on display 304) to the size of image thumbnail 350. In other examples, the size of graphical elements 310-314 may be directly proportional to the number of one or more columns and inversely indicative (i.e., the smaller the size of graphical elements 310-314, the larger the size of image thumbnail 350 when presented on display 304) the size of image thumbnail 350. In other examples, the configuration, function, layout, size, appearance, features, or other attributes of graphical elements 310-314 may be varied and are not limited to the descriptions provided.

Here, graphical element 314 is shown selected. As shown, when graphical element 314 is selected, a single column is presented, and the width of image thumbnail 350 is modified for presentation in one column. As an example, if the grid width of display 304 is 150, and graphical element 314 is selected, the column width is 150 and image thumbnail 350. Still further, the height of image thumbnail 350 may be determined as described above. In other examples, parameters related to graphical elements 310-314 may be varied and are not limited to the descriptions provided.

In some examples, when the grid width of display 304 is modified, the number of columns presented in display 304 may be determined based on a minimum image thumbnail size and a grid width, once modified. In other examples, when the grid width of display 304 is modified, the total number of columns presented in display 304 may be determined based on the grid width, once modified, and a previous image thumbnail width. For example, if the original grid width is 50 (e.g., pixels) and the width of the column is 50, when the grid width is set to 100, the column width remains 50 and the number of columns increases from one to two. In other examples, the number of columns in display 304 may be limited by a user, application (e.g., application 200 (FIG. 2)), system, administrator, or other. Further, interface 302 and the above-described elements may be varied and are not limited to the descriptions provided.

Figure 3D:
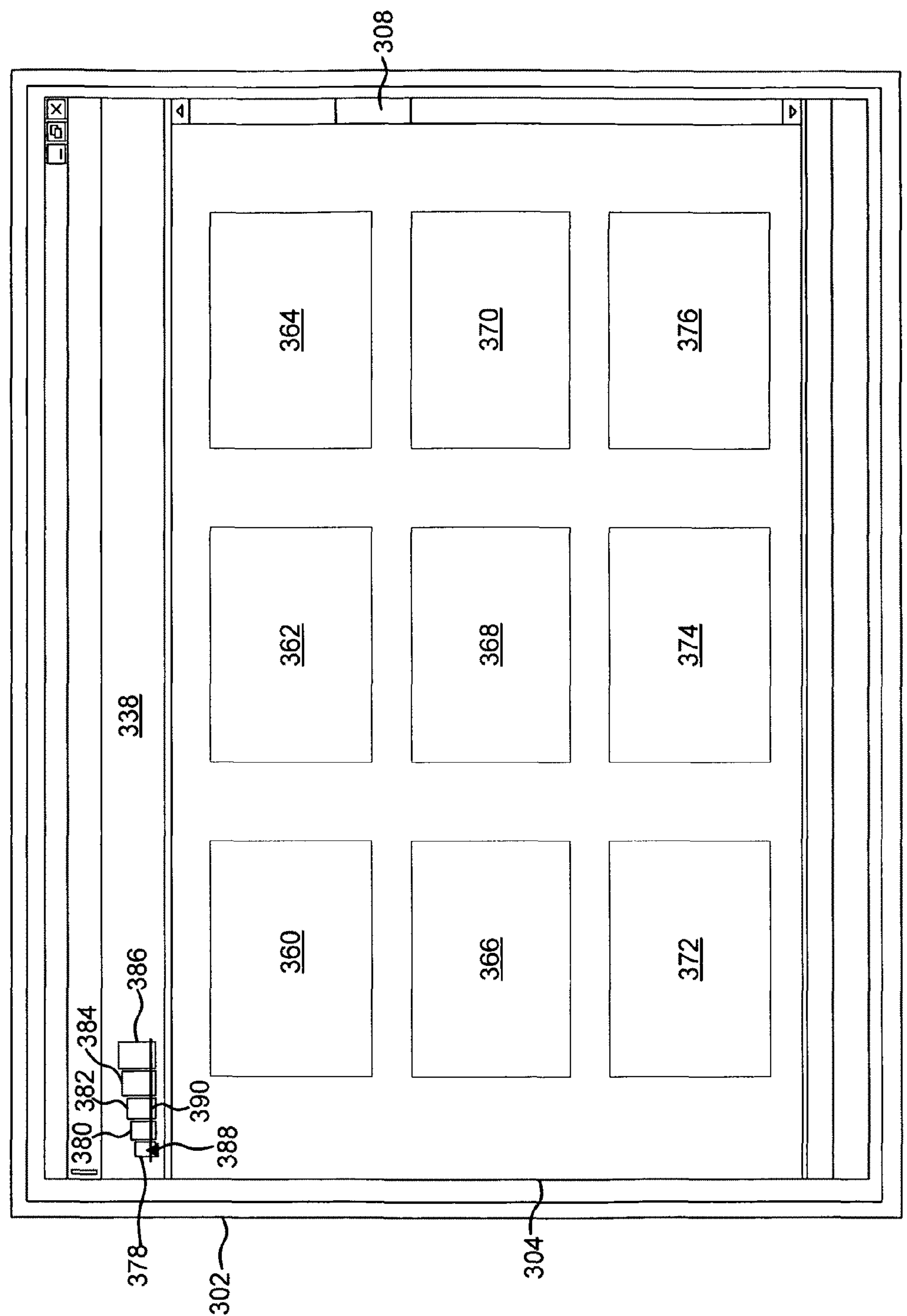
FIG. 3D illustrates an alternative exemplary interface for configurable iconic image representation.

FIG. 3D illustrates an alternative exemplary interface for configurable iconic image representation. Here, interface 302 includes display 304, scroll bar 308, panel 338, image thumbnails 360-376, graphical elements 378-386, slider 388, and slider guide 390. In some examples, graphical elements 378-386 may be implemented as an alternative to graphical elements 310-314 (FIGS. 3A-3C). Slider 388 may also be implemented as another alternative that, when manipulated allows for the selection of one or more of graphical elements 378-386, each of which may be similar or substantially similar to the techniques described herein.

As an example, slider 388 may be manipulated along slider guide 390 to select one or more of graphical elements 378-386. Once selected, image thumbnails 360-376 may be arrayed in columns using, for example, the techniques described herein for determining column width using grid width, the number of image thumbnails 360-376, and height available for each image thumbnail. Further, the space allocated (i.e., available height and width in pixels or other units of measurement) for each of image thumbnails 360-376 may be determined when slider 388 is manipulated over one or more graphical elements 378-386, invoking the described techniques. In other examples, other tools may be used to select, for example, one of graphical elements 378-386 apart from slider 388 and slider guide 390. In still other examples, interface 302 and the above-described elements may be varied and are not limited to the descriptions provided.

Figure 4:
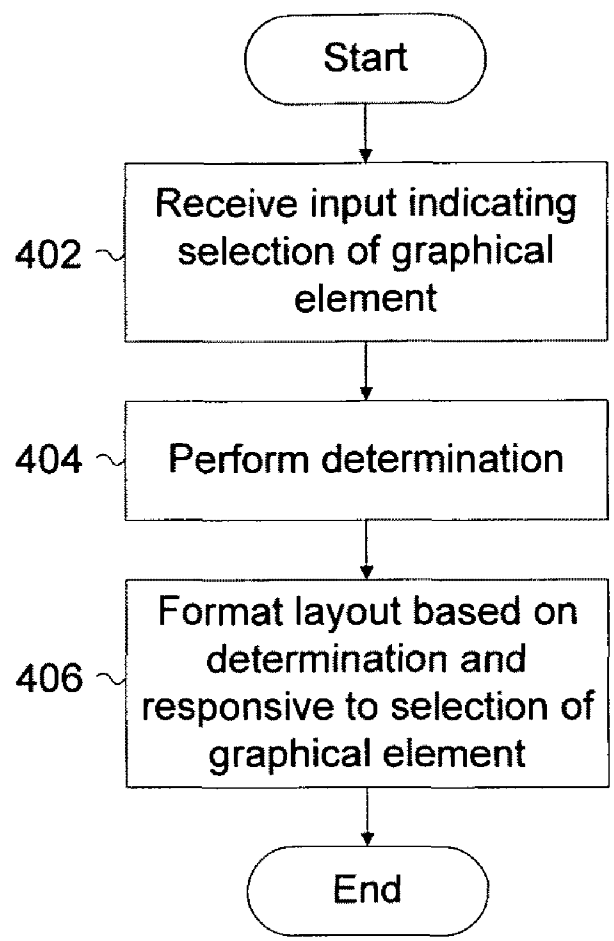
FIG. 4 illustrates an exemplary process for configurable iconic image representation.

FIG. 4 illustrates an exemplary process for configurable iconic image representation. Here, an input is received indicating selection of a graphical element (402). Once input is received, a determination is performed (404). In some examples, a determination may include evaluating a grid, a grid width, and a group of one or more items (e.g., image thumbnails) to determine a number of columns for presenting the group of image thumbnails, as described above. In other examples, a determination may also include one or more other determinations that are used to determine grid width, column width, image thumbnail height, minimum image thumbnail height, minimum image thumbnail width, and others. Based on the determination and in response to the selection of the graphical element, a layout of a display or interface is formatted (406). In some examples, a layout may refer to a column and row arrangement of items (e.g., image thumbnails) on an interface. When a graphical element (e.g., 310-314 (FIGS. 3A-3C)) is selected, the layout of an interface may be modified, as described above. The above-described process may be varied in function, processes, and performed in any arbitrary order and is not limited to the examples shown and described.

Figure 5:
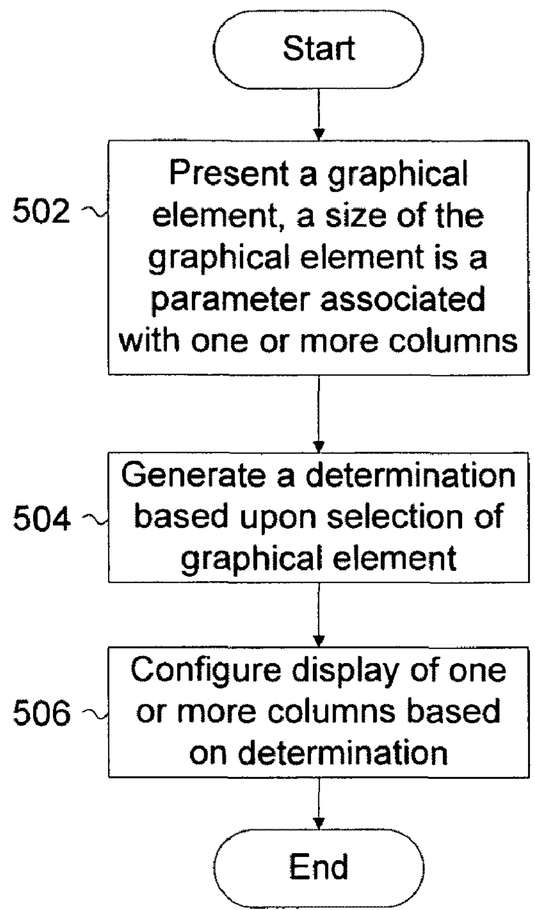
FIG. 5 illustrates an alternative exemplary process for configurable iconic image representation.

FIG. 5 illustrates an alternative exemplary process for configurable iconic image representation. Here, a graphical element is presented such that a size of the graphical element is associated with a parameter that may be used to present one or more image thumbnails in a columnar arrangement or layout, such as those described above (502). In some examples, a parameter associated with the size of a graphical element may include grid width, column width, image thumbnail height, or others. For example, a parameter may be associated with the number of one or more columns. As another example, a parameter may be associated with the width of one or more columns (i.e., column width). Alternatively, any other parameter, attribute, or characteristic of a column, grid, image or thumbnail may be associated with the size of the graphical element.

Here, a determination is generated based upon selection of a graphical element (e.g., graphical elements 310-314 (FIGS. 3A-3C)) (504). Using the results of a determination, image thumbnails, photos, images, icons, avatars, or any other type of on-screen element or item may be presented in one or more columns (506). In other examples, the above-described process may be varied in function, processes, and performed in any arbitrary order and is not limited to the examples shown and described.

Figure 6A:
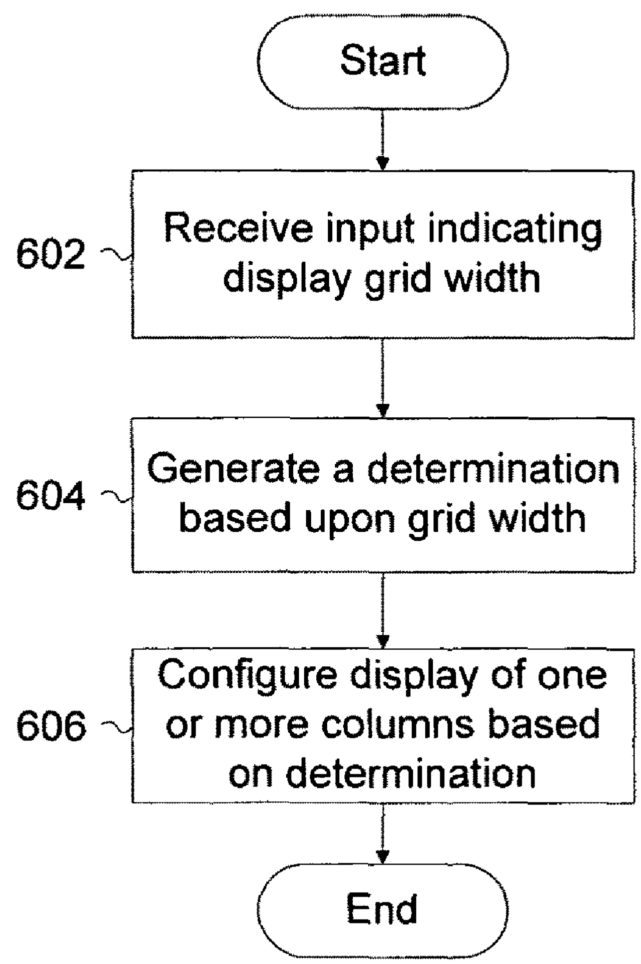
FIG. 6A illustrates an exemplary process for modifying grid width in configurable iconic image representation.

FIG. 6A illustrates an exemplary process for modifying grid width in configurable iconic image representation. In some examples, an input is received indicating, for example, a grid width associated with an interface (e.g., interface 302 (FIGS. 3A-3C)) or display (e.g., display 304 (FIGS. 3A-3C)) (602). In other examples, an input may also be configured to indicate other parameters, such as column width, element (e.g., image thumbnail) height, minimum grid width, maximum grid width, minimum column width, minimum column height, maximum number of columns, minimum number of columns, and others. As described above, limitations may be set for various parameters in order to present an interface that is configured by, for example, a user or administrator. After receiving an input, a determination using the input, such as those described above, is performed (604). Further, a display of one or more columns is configured based on the determination (606). In other examples, the above-described process may be varied in function, processes, and performed in any arbitrary order and is not limited to the examples shown and described.

Figure 6B:
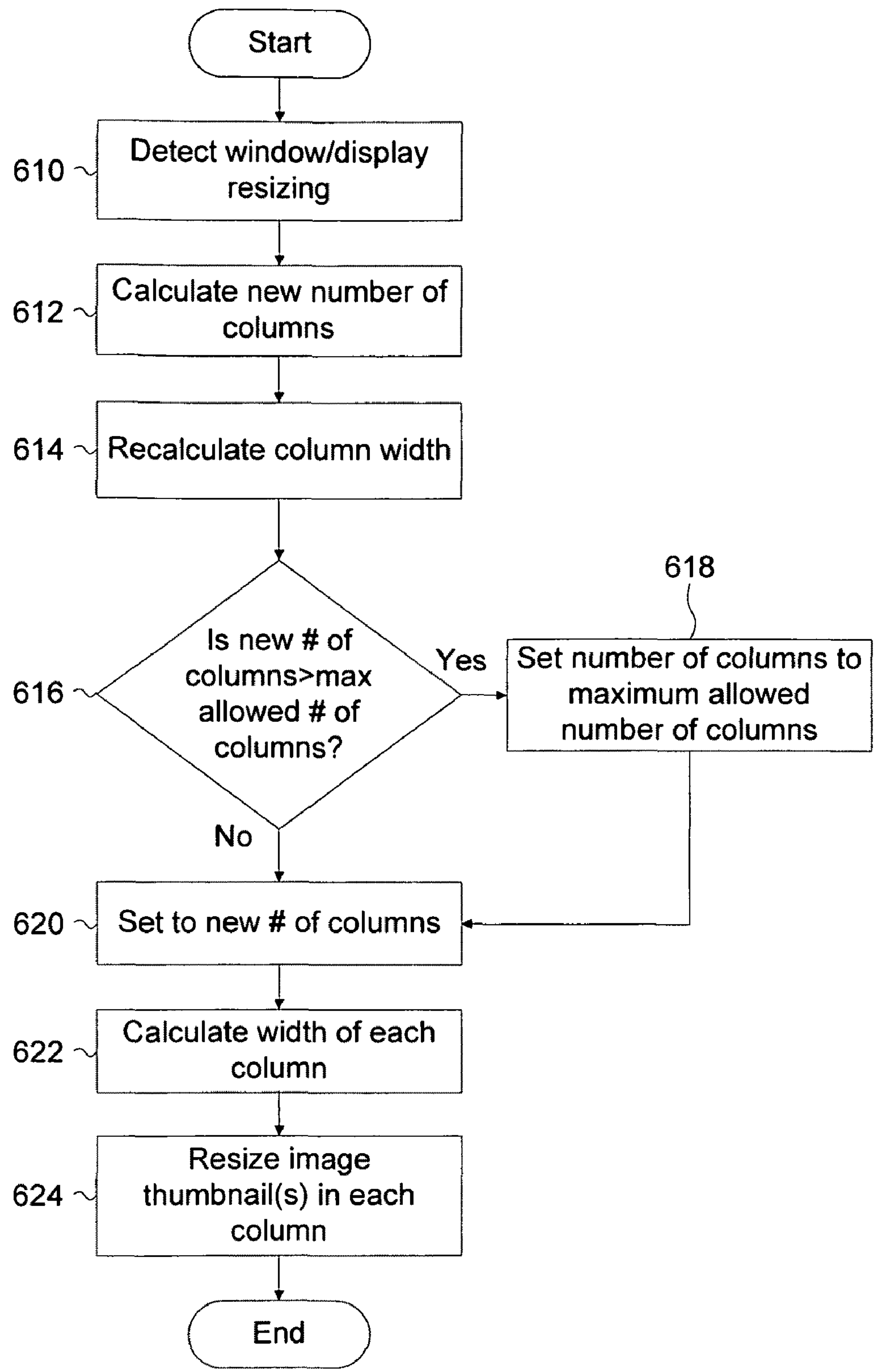
FIG. 6B illustrates an exemplary process for distributing column width in configurable iconic image representation.

FIG. 6B illustrates an exemplary process for distributing column width in configurable iconic image representation. In some examples, a window may interchangeably refer to a display (e.g., display 304 (FIGS. 3A-3D)). Here, a window or display (hereafter "display") resizing is detected (610). After detecting a display resizing or an input indicating that a display is to be resized, a new number of columns for the resulting grid width is determined (i.e., calculated) (612). For example, a new number of columns may be calculated by dividing a new window width by an old column width, which yields the number of columns that may be presented in the resized display. In other words:

New # of Cols.=(New Disp. Width/Previous Col. Width)

Or

New Disp. Col. Width=New Grid Width/New Number of Columns (614).

Here, a determination is made as to whether a new number of columns exceeds the maximum number of columns permitted in a given display (e.g., display 304 (FIGS. 3A-3D)) (616). If a new number of columns exceeds the maximum number of columns permitted in a given display, then the number of columns is set to the maximum number of columns allowed (618). If a new number of columns does not exceed the maximum number of columns permitted in a given display, then the number of columns is set to the new number of columns (620). After establishing a new number of columns, the width of each new column is determined (622). Once the new number of columns is determined the column width is the quotient of dividing the new grid width by the new number of columns. Further, each image thumbnail to be displayed in a new column is resized for each new column width (624). As an example, if a display with two columns is resized in grid width from 400 pixels to 630 pixels, using the above-described process, three columns may be presented in display 304 with a column width of 210 pixels. When display 304 (FIGS. 3A-3D) is resized, the described techniques provide for an additional column with image thumbnails or other items presented in each column that are 10 pixels wider than the previous layout. In other examples, the above-described process may be varied in function, processes, and performed in any arbitrary order and is not limited to the examples shown and described.

Figure 7:
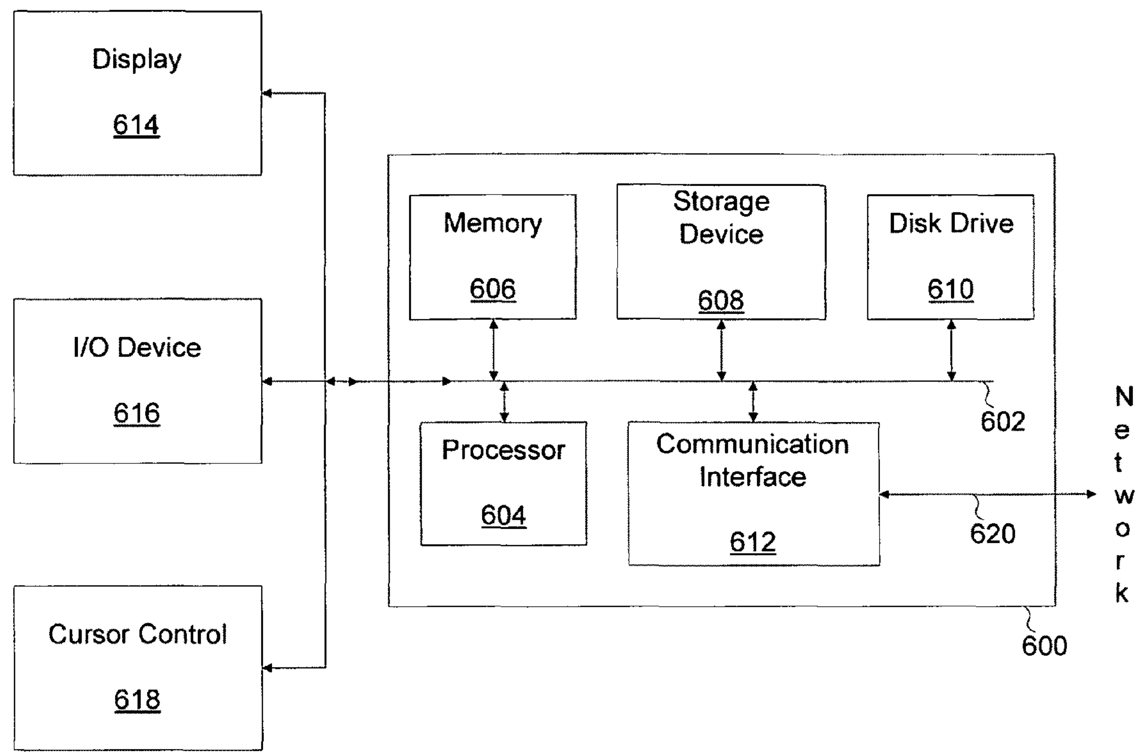
FIG. 7 illustrates an exemplary computer system suitable for configurable iconic image representation.

FIG. 7 illustrates an exemplary computer system suitable for configurable iconic image representation. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and others. Non-volatile media includes, for example, optical or magnetic disks, such as disk drive 610. Volatile media includes, for example, dynamic memory, such as system memory 606. Transmission media includes, for example, coaxial cables, copper wire, and fiber optics, including wires that comprise bus 602 for transmitting a computer data signal.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method, comprising:

receiving an input indicating a selection of a graphical element, wherein the graphical element is indicative of an image display format, wherein the graphical element is associated with a quantity of columns of a layout and with a size of images in the layout, and wherein the layout comprises a grid of images;

in response to said selection of the graphical element, performing a determination of the quantity of columns and size of images associated with the selected graphical element; and in response to the selection of the graphical element, formatting the grid of images into the quantity of columns and the size of the images from said determination.

2. The method of claim 1, further comprising resizing the quantity of columns based on the determination and a grid width.

3. The method of claim 2, wherein the quantity of columns comprise an image thumbnail.

4. The method of claim 1, further comprising determining a number of graphical elements based on a minimum column width and a grid width.

5. The method of claim 1, further comprising optimizing a column width based on the determination using a grid width.

6. The method of claim 1, further comprising determining a row height based on the determination using a column width.

7. The method of claim 1, wherein a size of the graphical element is inversely proportional to a quantity of the quantity of columns.

8. The method of claim 1, wherein a size of the graphical element is directly proportional to another size associated with one or more items presented in the quantity of columns.

9. The method of claim 1, wherein the graphical element is a geometric shape.

10. The method of claim 1, wherein the graphical element is an icon.

11. The method of claim 1, wherein the graphical element is a number.

12. The method of claim 1, wherein the determination comprises using a parameter associated with the graphical element indicating the quantity of columns.

13. The method of claim 12, wherein the parameter further indicates a column width associated with the quantity of columns.

14. The method of claim 1, wherein the parameter indicates a column height associated with the quantity of columns of the layout.

15. A method, comprising:

determining a number of graphical elements, wherein the number is based on a minimum column width and a grid width for a layout of images; and presenting a graphical element for each one of the determined number of graphical elements, wherein a respective size of each graphical element is a parameter associated with a quantity of columns of the layout and with a size of images in the layout, wherein the layout comprises a grid of images, and wherein when the graphical element is selected, the parameter is used to determine a size of the images and a number of columns within the layout.

16. The method of claim 15, wherein the size of each graphical element is a representation of a quantity and layout of images displayed.

17. The method of claim 1, wherein the number of graphical elements is based on a number of columns available for display.

18. The method of claim 17, wherein each of the plurality of items is an image thumbnail.

19. The method of claim 15, wherein the size of each graphical element is based on a division of a grid width of a display by a number of columns.

20. The method of claim 15, wherein the size of each graphical element is inversely proportional to a quantity of columns within a display and wherein each graphical element is directly proportional to a size of images within the display.

21. A system, comprising:

a memory configured to store data associated with an input; and a logic module configured to:

receive the input indicating a selection of a graphical element, wherein the graphical element is indicative of an image display format, wherein the graphical element is associated with a quantity of columns of a layout and with a size of images in the layout, and wherein the layout comprises a grid of images, in response to said selection of the graphical element, perform a determination of the quantity of columns and size of images associated with the selected graphical element, and in response to the selection of the graphical element, format the grid of images into the quantity of columns and the size of the images from said determination.

22. A computer program product embodied in a non-transitory computer readable medium and comprising computer instructions for:

receiving an input indicating a selection of a graphical element, wherein the graphical element is indicative of an image display format, wherein the graphical element is associated with a quantity of columns of a layout and with a size of images in the layout, and wherein the layout comprises a grid of images;

in response to said selection of the graphical element, performing a determination of the quantity of columns and size of images associated with the selected graphical element; and in response to the selection of the graphical element, formatting the grid of images into the quantity of columns and the size of the images from said determination.

* * * * *